May 16, 1961 H. H. MUELLER 2,984,490
APPARATUS FOR CONTROLLING INTERMISSION BETWEEN
THE AUTOMATIC PLAYING OF RECORDS
Filed Jan. 7, 1957 6 Sheets-Sheet 1

Herman H. Mueller
INVENTOR.

BY

Fig. 3
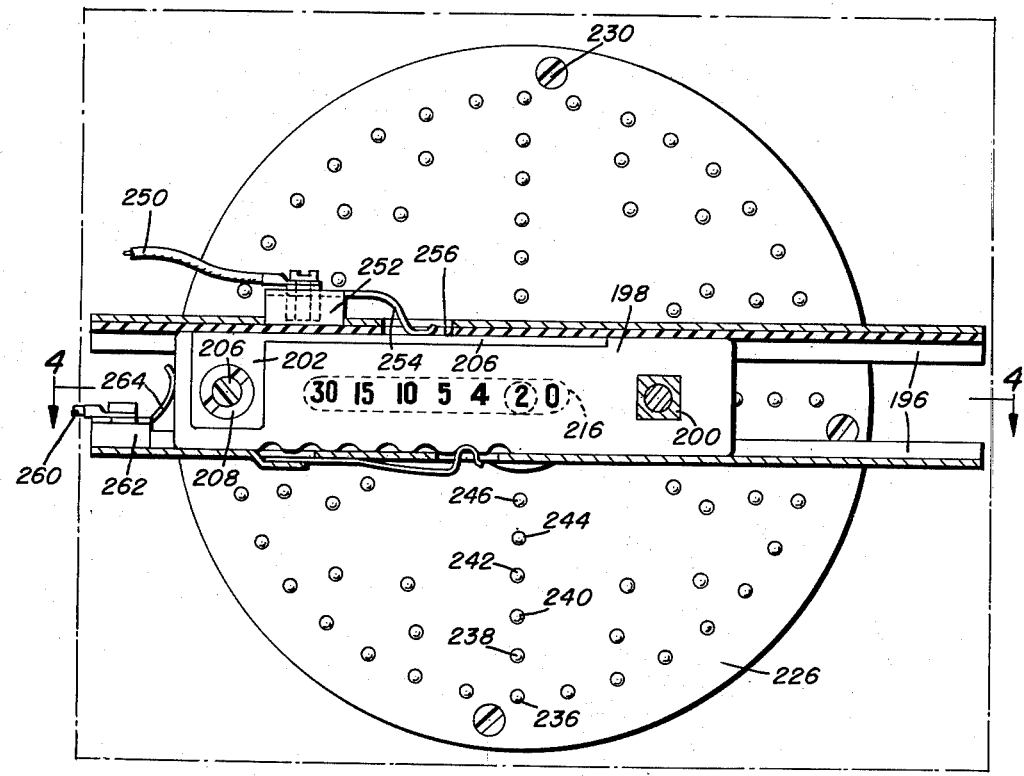
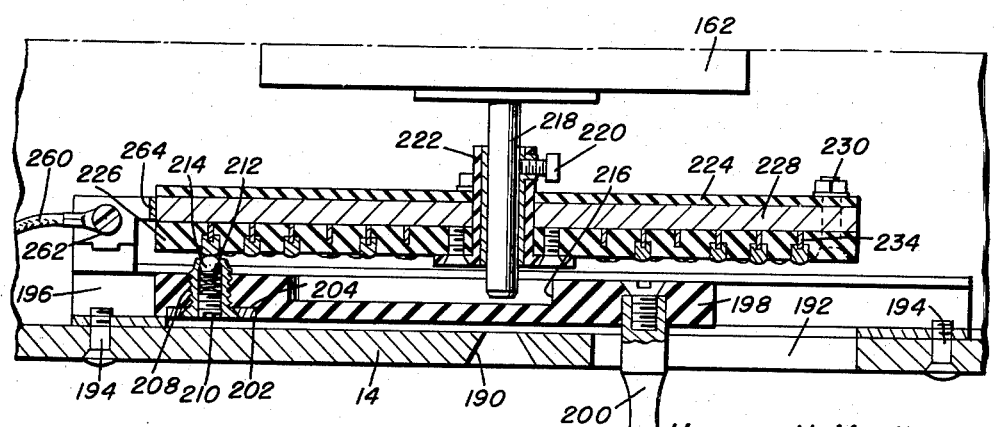
Fig. 4
Herman H. Mueller
INVENTOR.

May 16, 1961  H. H. MUELLER  2,984,490
APPARATUS FOR CONTROLLING INTERMISSION BETWEEN
THE AUTOMATIC PLAYING OF RECORDS
Filed Jan. 7, 1957                                                        6 Sheets-Sheet 3
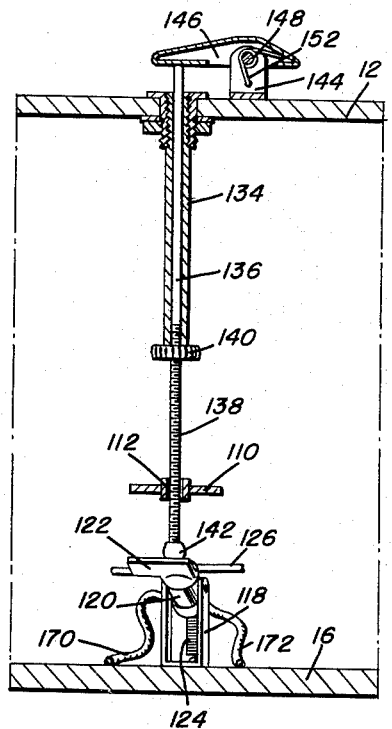
Fig. 5
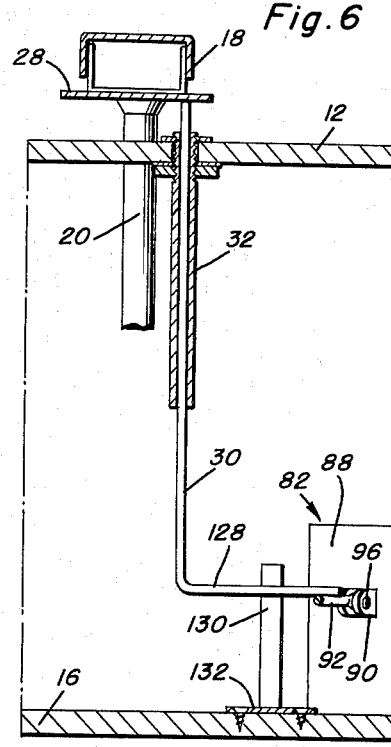
Fig. 6
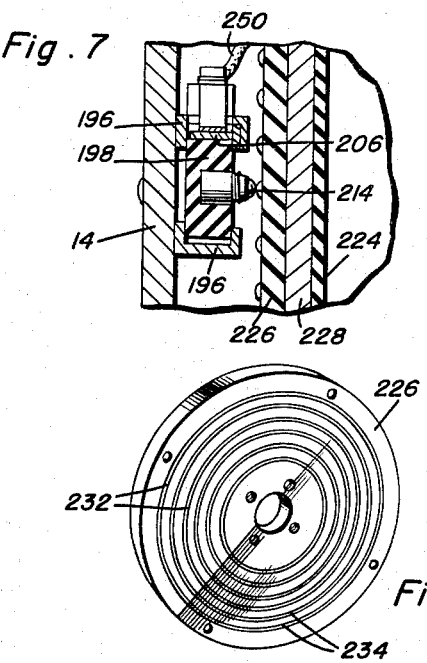
Fig. 7
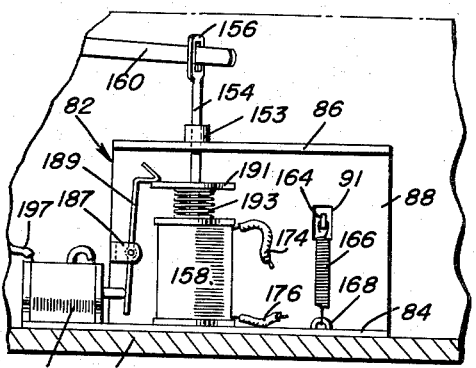
Fig. 8
Fig. 9
Herman H. Mueller
INVENTOR.
BY
Attorneys Herman H. Mueller
INVENTOR.

Herman H. Mueller
INVENTOR.

May 16, 1961
H. H. MUELLER
2,984,490
APPARATUS FOR CONTROLLING INTERMISSION BETWEEN
THE AUTOMATIC PLAYING OF RECORDS
Filed Jan. 7, 1957
6 Sheets-Sheet 6
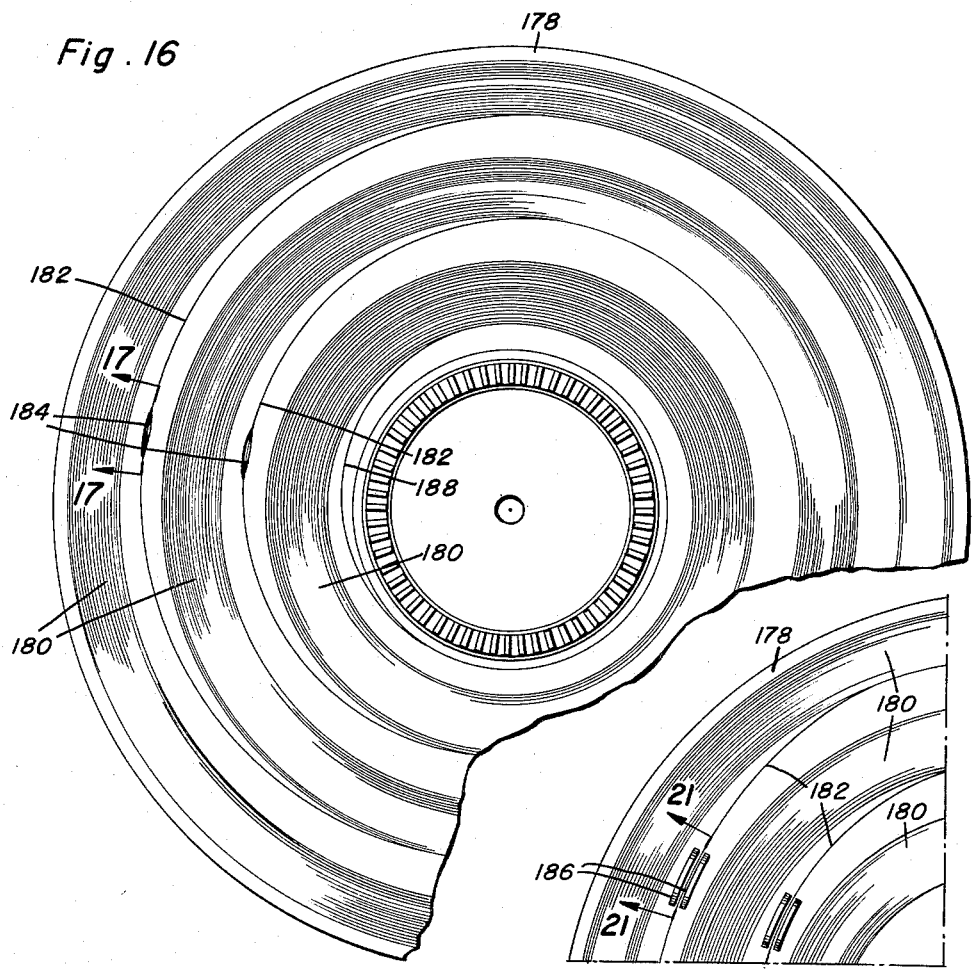
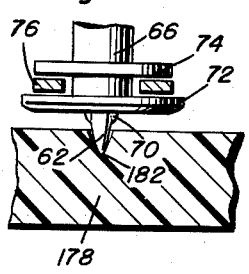
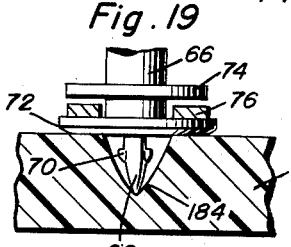
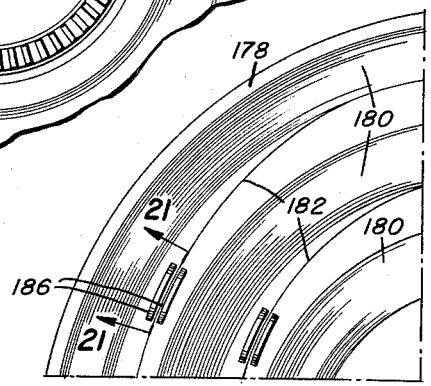
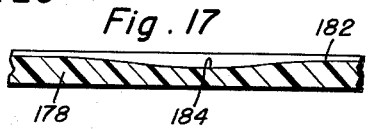
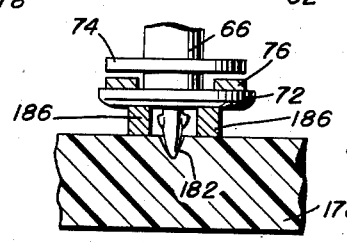
Herman H. Mueller
INVENTOR.
BY *Clarence A. O'Brien*
*and Harvey B. Jacobson*
Attorneys

United States Patent Office 2,984,490
Patented May 16, 1961

2,984,490

APPARATUS FOR CONTROLLING INTERMISSION BETWEEN THE AUTOMATIC PLAYING OF RECORDS

Herman H. Mueller, 104 Park Ave., Ephrata, Pa.; Elizabeth M. Mentzer, executrix of said Herman H. Mueller, deceased Filed Jan. 7, 1957, Ser. No. 632,877

28 Claims. (Cl. 274—1)

This invention comprises a novel and useful apparatus for controlling selectively and variably the intermission between the automatic playing of records and the playing of multiple recordings upon a single record and more particularly relates to a novel cooperating construction of a phonograph record disc, a tone arm and needle assembly and an automatic phonograph record player, whereby the automatic operation of the latter may be so controlled as to permit the obtaining of a variable, controlled time intermission between the completion of the playing of one recording and the automatic playing of a subsequent recording.

The primary object of this invention is to provide a mechanism which may be incorporated in an automatic record changer and player of the type disclosed in my prior Patent No. 2,729,455 and which will enable the automatic cyclic operation of the record player for automatically playing a series of records and/or recordings in sequence, to be modified whereby various desired time intervals may be interposed between the completion of the playing of one record or recording and the automatic playing of the next record or recording.

An additional object of the invention is to provide a time delay mechanism, operable by means mounted upon the tone arm of a record player, which will enable the operator of a record player to produce variable, controlled time intervals between the playing of successive records and/or recordings during the automatic operation of the record player.

A further object of the invention is to provide a mechanism in conformity with the preceding object which will not require any modification or change in the various elements of structure forming the conventional automatic record player and changer other than the interposition therein of the time controlled delay mechanism of this invention.

A further object of the invention is to provide a mechanism in conformity with the preceding objects which will enable the controllable time delay mechanism to be actuated by a very simple change in the structure of record discs having a plurality of recordings thereon.

A still further important object of the invention is to provide a timed delay mechanism in conformity with the above mentioned objects wherein cooperating elements on a record disc and on a tone arm shall be effective to initiate the actuation of the time delay mechanism.

Another object is to provide means whereby conventional record discs having multiple recordings thereon may be readily adapted, by the attaching of an adapter member thereto, for use with the time delay mechanism of this invention.

Yet another object of the invention is to provide an improved and compact needle assembly and means actuated thereby and carried by a tone arm for initiating actuation of the time delay mechanism of the record player.

More specifically, it is an object of this invention to provide an adjustable time delay mechanism for automatic record players whereby the automatic operation may be temporarily halted upon the completion of each recording, a clockwork time delay mechanism set in operation, and whereby the latter will after the desired time interval shut off itself and restore the automatic operation of the record player.

Still another purpose is to provide an apparatus in accordance with the foregoing objects which may be employed with a tone arm and stylus assembly adapted for the playing of the top and bottom sides of records and records requiring different needles and/or speeds, whereby an actuator carried by each needle may be readily coupled to or released from the time delay mechanism for actuation of the latter.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a fragmentary top plan view of a portion of a conventional type of an automatic record player and changer, a part of the top surface of the cabinet being broken away to show the arrangement of some of the mechanism forming a part of the present invention, there being shown upon the turntable a record disc of the multiple recording type and with the tone arm being shown in a position for actuation of the delay mechanism after the playing of one recording upon the record disc;

Figure 3 is a vertical sectional view taken on an enlarged scale substantially upon the plane indicated by the section line 3—3 of Figure 1 and showing certain of the details of the internal structure of the manual adjustment control and of the time delay mechanism;

Figure 4 is a horizontal sectional view taken substantially upon the plane indicated by the section line 4—4 of Figure 3;

Figure 5 is a vertical sectional view taken on an enlarged scale substantially upon the plane indicated by the section line 5—5 of Figure 1 and showing a portion of the tone arm actuated control means for the time delay mechanism;

Figure 6 is a view in vertical section taken on an enlarged scale substantially upon the plane indicated by the section line 6—6 of Figure 1 and showing a second tone arm actuated control means for the time delay mechanism;

Figure 7 is a vertical sectional detailed view taken on an enlarged scale substantially upon the plane indicated by the section line 7—7 of Figure 1 and showing further details of the manual adjustment control means;

Figure 8 is a vertical sectional detailed view taken on an enlarged scale substantially upon the plane indicated by section line 8—8 of Figure 1 and showing another control element of the time delay mechanism;

Figure 9 is a perspective view of one of the electrical contact elements of the manual adjustment control means;

Figure 16 is a top plan view of a record disc of the multiple recording type, part being broken away, and showing the modification of the record disc between successive recordings, which modified structure initiates the operation of the time delay mechanism of this invention;

Figure 17 is a vertical sectional view taken upon an enlarged scale substantially upon the plane indicated by the section line 17—17 of Figure 16 and showing the manner in which the needle groove between the successive recordings of the record disc is deepened in order to constitute an action initiating means for the time delay mechanism;

Figure 18 is a detailed view in vertical section, taken substantially upon a radius of the record disc and showing the manner in which the stylus or needle of the tone arm travels in the sound groove and in the unaltered portion of the control groove between successive recordings;

Figure 19 is a view similar to Figure 18, but showing the manner in which the stylus and needle assembly cooperate with the modification of the groove of Figures 16 and 17 in the actuation of the time delay mechanism;

Figure 20 is a fragmentary top plan view similar to Figure 16, but showing a portion of a record disc having a modified actuating element thereon for initiating operation of the time delay mechanism;

Figure 1:
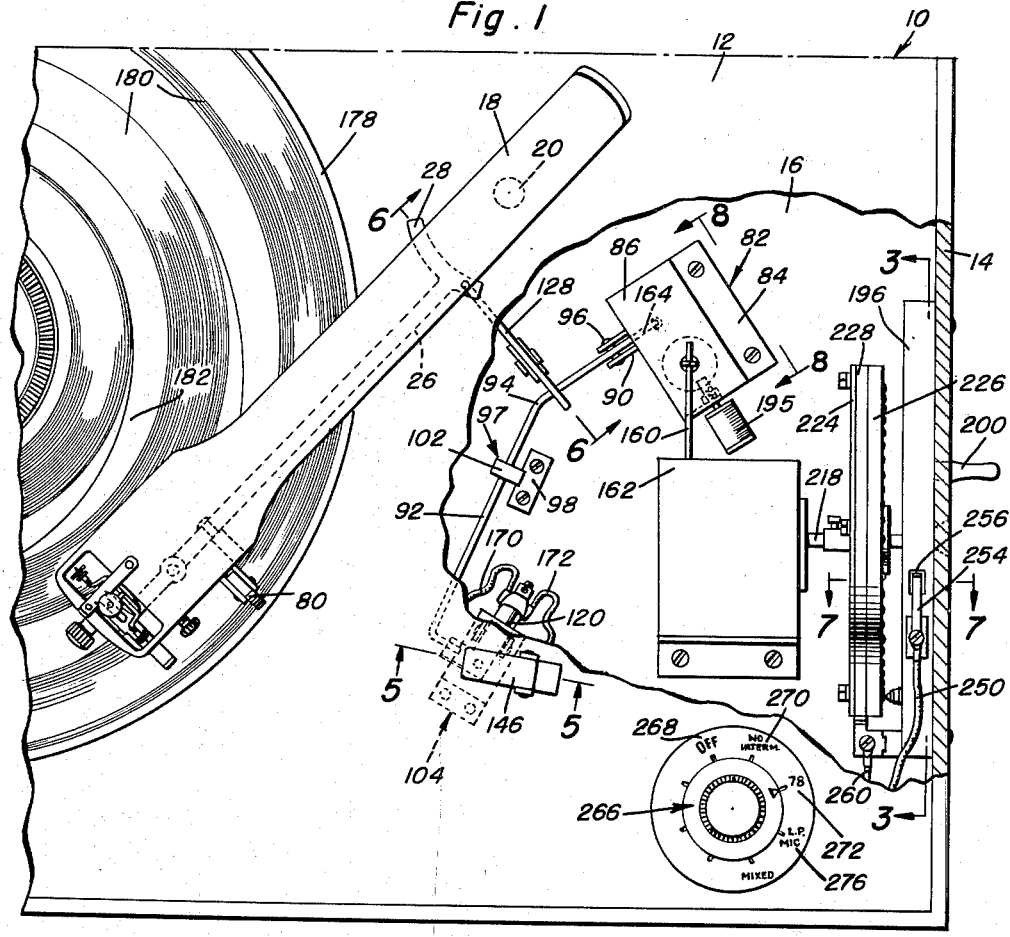

Figure 21 is an enlarged detailed view taken in vertical section substantially upon the plane indicated by the section line 21—21 of Figure 20 and showing a raised rib construction forming the modified actuating means mounted upon the record disc; and Figure 22 is a vertical sectional view taken upon a radial plane through the raised rib construction of Figures 20 and 21 and showing the manner in which these ribs cooperate with the stylus assembly of the tone arm for effecting actuation of the time delay mechanism.

Although the present invention is in no way limited to use with the automatic record player disclosed in my prior Patents No. 2,729,455, granted January 3, 1953, and 2,776,837 and 2,776,838, each granted on January 8, 1957, it is especially adapted for use therein; and is also especially adapted for use with the constructions set forth in my copending applications, Serial Nos. 296,558; 591,776; 598,973; 296,382; 314,987; 367,316; 476,732; 476,731; 347,507; 318,365; 359,082; 624,889; 674,117 and 674,118.

In general, the principles of this invention have been illustrated in the accompanying drawings as applied to structures set forth in the above listed patents and applications.

In the automatic playing of records, there is a fixed time interval between the completion of the playing of one recording and the beginning of the playing of the next recording which is usually in the order of about 30 seconds. It is frequently desirable, in order to obtain the maximum benefits and/or enjoyment from the automatic and sequential playing of records or record recordings, that this time interval between the completion of one recording and the beginning of the playing of the next recording be capable of variation. This is particularly desirable in order to enable the audience to fully appreciate the subject matter of the recording just played before the playing of the next recording begins; or to afford opportunity for the audience to discuss the recording just completed; or for other purposes. It is therefore the intention of the present invention to provide a mechanism which may be applied to any conventional type of a phonograph record player and changer, and especially to the structures of the above mentioned patents and applications, whereby the time interval between the playing of sequential recordings may be readily and widely varied at the discretion of the operator of the apparatus, or whereby the automatic operation of the record player may be permitted to continue without alteration.

For the purposes of this invention the desired controlled time interval between the completion of the playing of one recording and the beginning of the playing of the next recording is effected by effecting a stopping of the record playing and simultaneously therewith starting a clockwork mechanism which after the desired time interval, for which it is adjustably set, restores operation of the record player. This is effected by a switch which will disconnect the source of power to the record changer and player during that portion of the cycle of the automatic record player which occurs between the completion of the playing of one recording and the beginning of the playing of the next recording and utilizes an actuating mechanism carried by the tone arm and cooperating with an actuator on a record disc or cooperating with control means mounted upon or within the cabinet of the record player together with a manual adjustment control means which permits variation of the time or the intermission between the successive playing of recordings.

Referring first primarily to Figure 1, there is disclosed a portion of a conventional phonograph record player and changer, the same including a cabinet 10 having a top wall 12, together with side walls 14. There is also provided a partition or bottom wall 16 upon which various portions of the mechanism are mounted as set forth hereinafter.

Figure 12:
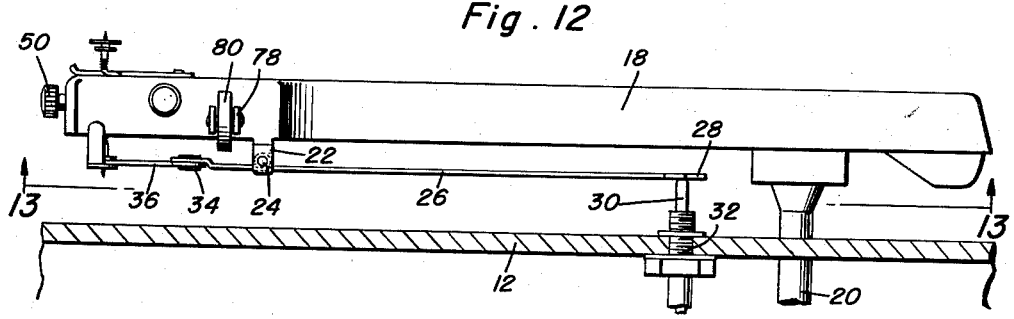
Figure 12 is a vertical sectional view showing in side elevation and on an enlarged scale the tone arm and those elements of the time delay mechanism which are carried thereby.
Figure 13:
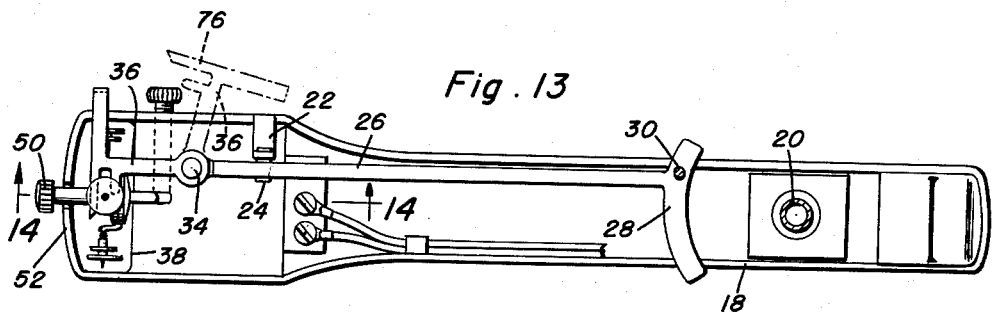
Figure 13 is a horizontal sectional view taken substantially upon the plane indicated by the section line 13—13 of Figure 12 and showing in plan the bottom surface of the tone arm and the mechanism mounted thereon.

Forming a part of the conventional record player is a tone arm 18, see also Figures 12 and 13, which tone arm is mounted upon and carried by a support post 20, whereby the tone arm may be raised, lowered, tilted upwardly or downwardly and swung horizontally in accordance with conventional practice by the usual tone arm operating mechanism which being of a conventional nature, and since the principles of this invention are not limited to any particular tone arm actuating mechanism, have not been illustrated in the drawings.

It will be understood that the conventional record player is also provided with the usual spindle, turntable, and record supporting and releasing means. Inasmuch as these elements may be all of conventional design, and since the present invention is in no way limited to a particular construction of the same, illustration of these conventional elements is deemed to be unnecessary and therefore is omitted from the drawings.

Figure 14:
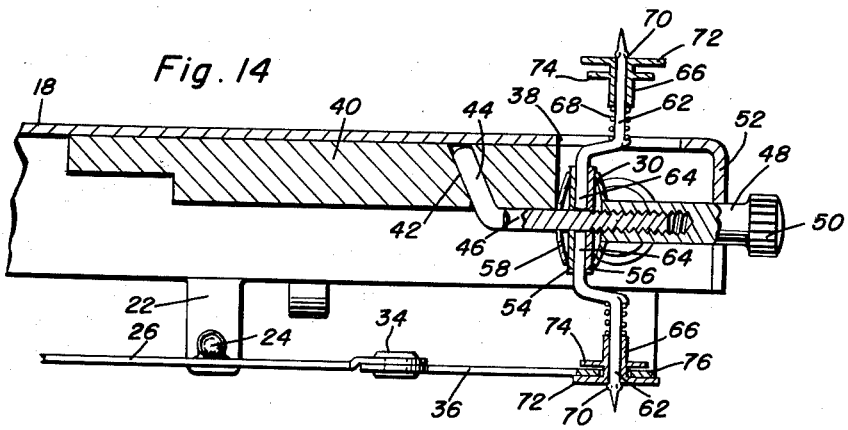
Figure 14 is a detailed view taken on an enlarged scale substantially upon the plane indicated by the section line 14—14 of Figure 13 and shows the novel needle assembly forming a part of this invention.
Figure 15:
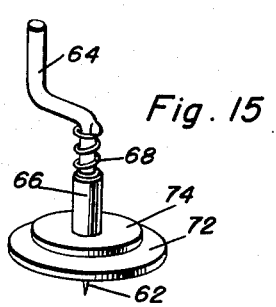
Figure 15 is a perspective detailed view of the modified tone arm stylus or needle assembly forming a part of the present invention.

Mounted upon the tone arm is a mechanism which initiates operation of the time delay mechanism. Referring now primarily to Figures 12-14, it will be seen that the tone arm upon its underside is provided with a depending apertured lug 22 to which is pivotally secured, as by a pivot pin 24, the forward portion of a longitudinally extending lever 26. This lever is thus pivoted for vertical tilting movement about the pivot pin 24 for a purpose to be subsequently apparent.

At its rearward end the lever 26 is provided with an arcuate, laterally extending portion in the form of a segment 28, see Figures 1, 10, 12 and 13, which arcuate segment is concentric with the vertical axis of the support post 20 of the tone arm. This segment, as seen in Figure 6, overlies the upper end of the actuating rod 30 which extends through and is journaled in the guide bushing 32 disposed in and depending from the top wall 12 of the cabinet, the lever and its arcuate segment being at all times in operative association with the rod 30 during horizontal swinging movement of the tone arm as the needle traverses the sound track upon a record disc.

As so far described, it will now be apparent from Figure 12 that upon downward or clockwise tilting of the lever 26 and its arcuate segment 28, the actuating rod 30 will be depressed for actuation of the time delay mechanism in a manner to be subsequently set forth. This downward tilting is effected as follows.

Extending beyond the pivot 24, at its forward end the lever 26 is provided with a pivot 34 by means of which is secured an arm 36 which forms a horizontally or laterally swingable forward extension of the lever. As will be seen from the full line and dotted line showings in Figure 13, the arm 36 may be swung into longitudinal alignment with the lever 26, which is its operative position, or may be swung laterally thereof as shown in dotted lines into an inoperative position. In its inoperative position, the arm 36 permits rotation of the stylus assembly, whereby the stylus needles may be changed or replaced to adapt the instrument for selectively playing the microgroove long-playing type of records of different speeds or the 45 or 75 r.p.m. record discs.

Figure 10:
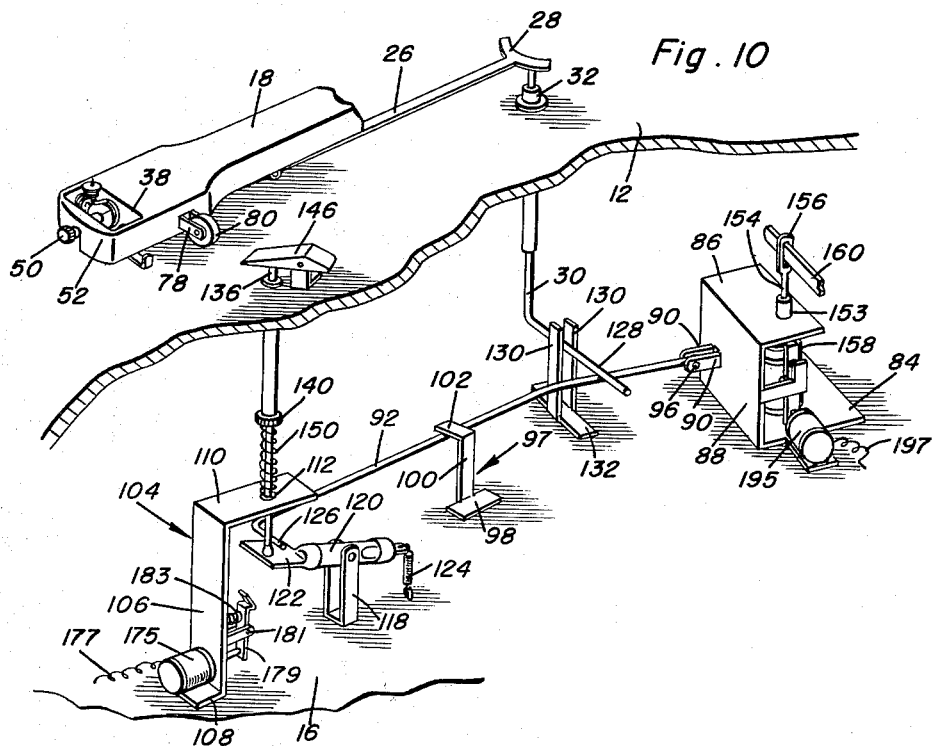
Figure 10 is a fragmentary schematic perspective view, parts being broken away, and showing the tone arm and its operative association with the two tone arm actuated control means of Figures 5 and 6 and the association of the latter with other elements of the control mechanism of the time delay means.

Referring now particularly to Figures 1, 10 and 14, it will be seen that the stylus end of the tone arm 18 is provided with a vertically disposed slot or aperture 38 therethrough. As will be readily apparent from Figure 13, this slot 38 is of sufficient transverse extent to permit the stylus assembly to be rotated therein about an axis which is inclined slightly to the longitudinal axis of the tone arm whereby to position selected needles above and below the tone arm in playing position.

The stylus assembly consists of a mounting block 40 secured to the underside of the interior of the tone arm, which latter is U-shaped in cross section, the mounting block being provided in its forward portion with an inclined, downwardly opening bore 42. The angularly disposed extremity 44 of a spindle 46 is received and held in the bore 42, the outer end of the spindle being externally threaded for the reception of an internally threaded locking stem or sleeve 48 having a knurled finger grip portion 50 projecting beyond the end wall 52 of the tone arm. A pair of complementary clamping plates 54 and 56 are received upon the spindle 46 and are disposed between a pair of spring washers or flanges 58 and 60, respectively engaged by the end of the mounting block 40 and the locking stem of sleeve 48 or are respectively rigidly secured to the members 46 and 48.

There are provided a pair of styluses or needles, each indicated by the numeral 62, although it will be understood that the needles are of suitable types to be employed with the various types of sound tracks.

Each needle includes a shank 64 which is disposed between the complementary clamping plates 54 and 56 in a suitable manner. It is thus evident that by tightening the locking stem or sleeve 48, that the needle shanks may be clamped in place to thus rigidly secure the needles in a unitary needle assembly. As will be understood, the needles form part of the conventional pick-up unit of the tone arm. Although only two needles are shown for convenience of illustration in the drawings, it is understood that a plurality of pairs of needles are preferred, as disclosed in my copending application Serial No. 591,776.

In accordance with the present invention, a spool 66 is slidably received upon each of the needles, being urged by compression spring 68 outwardly thereof and being prevented from movement off the end of the needle as by an enlargement 70 formed on each needle adjacent the point thereof. The spool includes a pair of spaced flanges, the outermost flange being indicated at 72, while the inner flange is shown at 74.

Referring again to Figure 13, it will be seen that the end of the arm 36 is provided with a bifurcated fork 76 which is adapted to be received between the flanges 72 and 74, as will be apparent from Figure 14 and from the full line showing of Figure 13, when the arm is swung into longitudinal alignment with the lever 26. Thus, in the operative position of the forked arm 36, the lever 26 is connected to the spool 66 whereby in response to upward vertical movement of the spool upon the needle 62, the lever may be tilted vertically about its pivot or fulcrum 24 and thereby depress the rod 30 as previously mentioned.

Projecting laterally from the side of the tone arm at the stylus end thereof is a bifurcated bracket 78 upon which is journaled a roller 80. The roller 80 and the lever 26 serve to selectively initiate operation of the time delay mechanism as will become subsequently apparent.

Referring now primarily to Figure 10 in conjunction with Figures 1, 6 and 8, it will be observed that the partition or floor 16 has a U-shaped mounting bracket 82 rising therefrom having a bottom flange 84, a top flange 86 and a vertical wall connecting these flanges as at 88. The wall 88 has a pair of apertured brackets 90 projecting therefrom, between which the wall 88 is provided with an aperture 91, see Figure 8. A lever 92, which in the interest of compactness may be bent at its mid-portion as at 94, see Figure 1, is pivoted adjacent one end between the brackets 90 as by a pivot pin 96 and has its end extending through the aperture 91 into the bracket 82 between the top and bottom flanges 86 and 84. Thus, the lever 92 is pivoted for vertical movement about the pivot pin 96.

A Z-shaped bracket indicated generally by the numeral 97 is mounted, see Figures 1 and 10, this bracket having a mounting flange 98 secured to the bottom wall 16, together with a vertical arm 100 and at the upper end of the latter there is provided a horizontally extending arm 102 which overlies the lever 92 and thus limits its upward travel.

There is also provided a still further bracket 104, see Figure 10, which consists of a vertical arm 106 having a mounting flange 108 at its lower end secured to the bottom wall 16 and its upper end having a horizontal flange 110 which overlies the extremity of the lever 92 and which is vertically apertured as at 112. Also projecting from the mounting flange 108 is a laterally projecting portion 114 having a vertically offset portion 116 comprising a stop member underlying the aperture 112 for a purpose to be subsequently set forth.

A U-shaped bracket 118 is secured to the bottom wall 16 adjacent the bracket 104 and pivotally supports a mercury switch element 120 for vertical tilting movement, this switch serving a dual function as set forth hereinafter. The mercury switch at one end is provided with a projecting end plate 122, comprising an actuating member for the mercury switch which member is disposed below the aperture 112 in the flange 110. Secured to the other end of the mercury switch and to the floor 16 is a spring 124 which yieldingly urges the mercury switch into a position with the member 122 in raised position. The member 122 and the spring 124 serve to move the mercury switch into either its circuit opening or closing position alternately activated for either of two electrical circuits as set forth hereinafter.

The outer end of the lever 92 which is remote from the pivot 96 is provided with an angulated terminal portion 126 which is adapted to extend below the flange 110 to overlie and abut against the end plate or actuator 122 of the mercury switch as will be apparent from Figures 10 and 5.

Referring now more particularly to Figures 1, 6 and 10, it will be seen that the lower end of the vertical actuating rod 30 previously mentioned is provided with a horizontal and laterally extending portion 128 which overlies the lever 92, and which is received between a pair of vertical guides 130 mounted upon the floor or partition 16 as by a base plate 132. It will thus be seen that the rod 30 has its upper or vertical portion guided for vertical movement by the bushing or sleeve 32 and its lower or horizontal portion is guided by the guide members 130 and overlies the lever 92 for depressing and actuating the latter.

Referring next primarily to Figures 1, 5 and 10, it will be observed that the top wall 12 has a bushing or sleeve 134 extending therethrough and fixedly secured thereto to provide a guide bushing in which a vertical actuating rod 136 is slidably received. The lower end of this rod is externally threaded, as at 138, and a lock nut 140 is secured thereto to abut against the lower end of the sleeve 134 and constitute a stop limiting upward movement of this rod. The lower end of the rod extends through the aperture 112 and therebeneath terminates in a foot member 142 which is adapted to abut against the top surface of the end plate 122 of the mercury switch whereby the latter may be actuated selectively by the foot member 142 or by the extremity 126 of the lever 92.

By means of a U-shaped bracket 144 mounted upon the top wall 12, a cam lever 146 is pivotally mounted as at 148. This cam lever, as shown in Figures 1, 5 and 10, abuttingly engages and rests upon the upper end of the actuator rod 136 whereby when the cam lever is depressed, the actuator rod will be lowered for actuation of the mercury switch. The cam lever is so placed that the inclined top surface thereof will be engaged by the previously mentioned roller 80 carried by the tone arm when the latter is swung horizontally outwardly from a record, during the record changing operation of a conventional type of automatic record player and changer. As shown in Figure 10, a compression spring 150 is interposed between the lock nut 140 and the horizontal flange 110, surrounding the rod 136 to yieldingly urge the latter into its upward position. In addition, any conventional form of spring 152 of lesser strength than the spring 150 may be operatively engaged with the bracket 144, the pivot 148 and the cam lever 146 for yieldingly urging the cam lever in a direction to maintain engagement of the same with the rod 136.

Referring now primarily to Figures 8 and 10, it will be seen that a guide sleeve or bushing 153 is secured to the bracket 82 and extends through the top flange 86 thereof. Slidable in this bushing is a rod 154 having an eye 156 at its upper end. The lower end of this rod forms a part of a solenoid core received within a solenoid 158 mounted upon the bottom flange 84 of the bracket. An actuator lever 160 has one end extending through the eye 156 for actuation thereby and the other end extends into a time clockwork mechanism 162 of any suitable and known construction and which is secured to the bottom wall 16. When the solenoid 158 is energized, the lever 160 will be actuated to place the clockwork mechanism 162 in operation for a purpose to be hereinafter set forth.

Referring again to Figure 8, it will be seen that the end portion of the lever 92 extends past the pivot pin 96 through the aperture 91 between the members 90 and into the bracket 82, and has its extremity indicated at 164 apertured for the reception of a tension spring 166 whose other end is attached as at 168 to the bottom flange 88 of the bracket. The spring 166 thus yieldingly urges the outwardly projecting portion of the lever 92 which lies outwardly of and beyond the pivot pin 96 to a vertically raised position which is limited by the arm 102 of the bracket 97. The lever 92 is maintained in raised position against the stop member 102 until such time as the end portion 128 of the actuator rod 30 depresses the lever 92, and thereby causes its end 126 to depress the plate 122 and thereby actuate the mercury switch 120.

Figure 11:
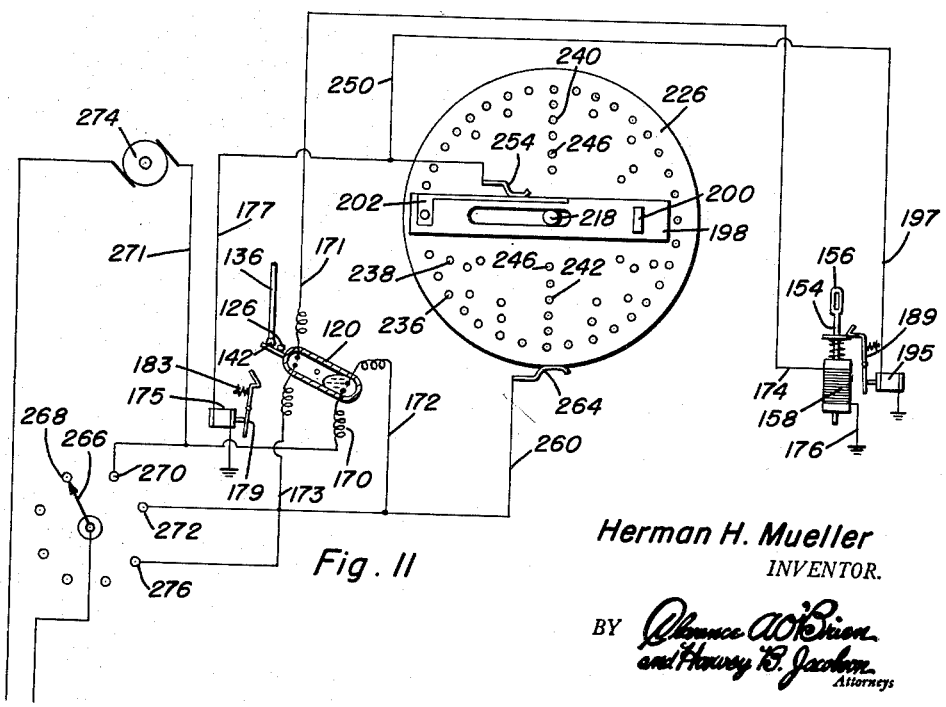
Figure 11 is a diagrammatic view illustrating the electric circuit embodied in this invention.

As shown in Figure 11, the mercury switch has at its right end a pair of terminals connected to the electric conductors 170, 172, while the winding of the solenoid 158 has power and ground conductors 174 and 176. These conductors form part of an electrical circuit to be hereinafter set forth. At its left end, the mercury switch has a pair of terminals connected to the conductors 171 and 173, for a purpose to be later set forth. It will be now apparent that when the mercury switch is tilted into either position, one set of terminals and the electric circuit associated therewith will be rendered capable of activation.

When the present invention is applied to automatic record players and changers of the type handling records with but a single recording on one side of a record disc, then the intermission control mechanism is activated by the engagement of the roller 80 on the tone arm, with the cam lever 146, when the tone arm is swung horizontally from the record to the side of the record player during the conventional record changing operation of the apparatus. However, this mechanism can also be employed, without alteration, in the same type of automatic record player and changer when the machine is used for reproducing from the micro-groove, long-playing type of records having multiple recordings on a single record disc. For that purpose, the lever 26 carried by the tone arm and the associated above described mechanism is employed.

In both types of operation with both types of records, the mercury switch is tilted by depressing its end member 122, either by the rod 136 actuated by the roller 80 and cam lever 146 or by the end 126 of the lever 92 upon actuation by the rod 30, lever 26 and the stylus assembly. Tilting of the mercury switch stops operation of the record player by cutting off its power supply and starts the clockwork of the time delay mechanism which will restore the power supply after the selected time interval.

Referring to Figure 1, the tone arm stylus or needle assembly is operatively engaged with a record disc 178 of the multiple recording type and which has a plurality of radially spaced recordings or sound tracks 180 thereon. Between each adjacent pair of recordings 180 there is provided the conventional connecting groove 182 which moves the stylus of the tone arm from the closing portion of the recording just played to the initial portion of the new recording to be played by the apparatus. In accordance with this invention, use is made of this connecting groove or track 180 for the purpose of activating the time delay mechanism of this invention.

For that purpose, reference is now made to Figures 16–19, wherein it will be seen that a slight modification of the groove 182 is required. Thus, as at 184, the groove is considerably widened and deepened for a very short circumferential interval. As shown in Figure 18, the point of the needle or stylus 62 rides in the bottom of the groove 182 and in the bottom of the sound track during the playing of a recording 180, thereby supporting the weight of the tone arm upon the record. This position is shown in Figure 18, in which it will be seen that the spool 66 is supported by its outer flange 72 which rests upon the projections 70 of the needle, this outer flange being at this time out of contact with the record disc whereby the fork 76 of the arm 36 is in a lowered position relative to the needle stop 70 and the tone arm 18. However, when the stylus reaches the portion 184, the weight of the tone arm causes the needle 62 to drop further downwardly into the groove. This causes the outer flange 72 to engage and rest upon the record 178 so that the spool carrying the fork 76 rests upon the record while the stylus and needle move downwardly through the spool as will be apparent from Figure 19. This upward movement of the spool 66 on the needle and of the connected fork at the end of the lever 26 causes the latter to pivot about its pivot pin 24 and in turn depresses the segment 28, which in turn moves the actuator rod 30 downwardly and through this motion depresses the lever 92, causing the same to tilt downwardly about its pivot pin 96. Downward movement of the extremity 126 or lever 92 in turn trips the mercury switch 120 against the action of the spring 124, and through an electrical circuit to be subsequently set forth, cuts off the electric power of the phonograph record player and starts the clockwork mechanism 162. Accordingly, further operation of a phonograph record player mechanism ceases until the predetermined and preselected time interval has passed. Thereafter, current is restored to the mechanism by the clockwork mechanism and the automatic operation of the same continues.

As shown in Figures 20, 21 and 22, a slightly modified construction of a record disc 178 is possible for use with record discs of the multiple recording type, for effecting the same results. Thus, the grooves 184 between the recordings 180 instead of being provided with recessed portions are provided with pairs of upwardly projecting ribs or cams 186. As shown in Figure 22, these ribs will engage the outer flange 72 of the spool 66 and elevate the same upon the needle 66 above the projection 70, thereby serving to tilt the lever 26 in the same manner and to perform the same operations as previously mentioned.

It will thus be apparent that actuated elements in the form of recesses or cam elevations on the record disc and between pairs of multiple recordings thereon cooperate with an actuating mechanism carried by the tone arm for initiating operation of the timed interval or intermission between the playing of successive recordings.

The embodiment of Figures 20-22 is preferred generally to that of Figures 16-19, since the former does not in any way weaken the record disc but actually strengthens or reinforces the same at the actuating portion thereof. Further, this embodiment enables conventional records to be easily adapted for use in this invention by merely applying the cam elements 186 as adapter elements which may be secured by adhesive or otherwise to a record disc.

It is to be especially noted that a conventional record disc of the long-playing, multiple recording type may be readily adapted for use with this mechanism by merely, at a selected location, providing a widened and deepened portion 184 in the transition groove 182 between two successive recordings, or by applying to such transition grooves the cams or ribs 186. It is also to be noted that in conventional records of all types the same depression or cam ribs may be applied to the central groove 188 which is disposed in the central portion of the record inwardly of the last sound track thereon and which activates the record changing mechanism. Thus, the cooperative and novel association of a record and the mechanism carried by the tone arm may be employed for all types of records and may be employed in an apparatus where different types of records are intermixed thereon for automatic successive playing.

Reference is now made to Figures 1-4, 6, 9 and 11 for an understanding of the manually adjustable control means by which the intermission or time delay between the playing of successive recordings initiated by the tone arm and needle assembly as hereinbefore set forth may be selectively adjusted.

Figure 2:
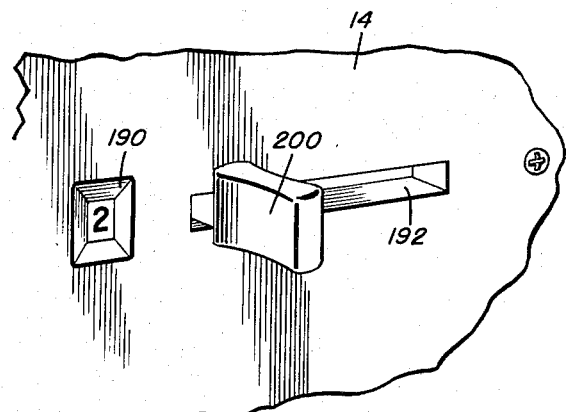
Figure 2 is a fragmentary elevational view in perspective, on an enlarged scale, and taken from the right side of Figure 1 and showing the manual adjustment control of the time delay mechanism.

As will be seen by particular reference to Figures 2 and 4, the side wall of the cabinet 14 is provided with a visual inspection opening 190 and with a laterally elongated slot 192. Secured to the inside surface of the side wall 14, as by screws 194, are a pair of channel members 196 comprising a slide track in which is slidably received a slide 198 consisting of a block of insulating material having a projecting handle 200 which extends through the slot 190 to the exterior of the cabinet for actuation manually by the operator. As will be better apparent from Figure 3, the slide track consists of a pair of vertically spaced upper and lower channel members 196 between which the block 198 is received.

A metallic plate 202, Figures 3 and 4, is secured in a recess 204 in one surface of the slide and has a longitudinally projecting strip 206 which is recessed in the top of the slide and provides a sliding electrical contact thereon. The plate 202 is retained in the recess 204 by means of an externally threaded tubular sleeve 208 which is secured in and extends through the body 198, and the sleeve has an externally threaded plug 210 in the outer end thereof, which by means of a spring 212 yieldingly urges a metallic ball 214 outwardly of the sleeve and of the insulative block to form a moving contact as set forth hereinafter.

As shown in full lines in Figure 4, and in dotted lines in Figure 3, that side of the slide body 198 which is remote from the plate 200 is provided with a longitudinal slot 216. A shaft 218 is loosely received within this slot, this shaft being carried by and forming a part of the time clock mechanism 162 previously mentioned. Accordingly, when the time clock mechanism is running, the shaft 218 is likewise turning.

Secured to the end of the shaft 218 as by a set screw 220 is an insulating bushing or sleeve 222. Rigidly mounted upon this bushing, see also Figure 7, is a rear insulating disc 224 and a front insulating disc 226 with a metallic disc 228 being interposed therebetween. Fastening bolts or the like 230 serve to secure these three discs in rigid assembly.

As will be seen from Figure 9, the rear surface of the front insulating disc 226 is provided with a plurality of circular grooves 232 in which are seated circular rings 234 of a conductive material which are in direct electrical contact with the metallic central disc 228. Upon the front face of the insulating front disc 226 there are provided, as shown in Figure 3, a plurality of circular rows of metallic contact members 236, 238, 240, 242, 244 and 246. It will be understood that the outermost of the separate set of rings 236 will be in electrical communication with the outermost of the rings 234; the next radially inward set of contacts 238 will be in contact with a second ring 234, and so forth. As will be seen best from Figure 3, each of the set of circular contacts 236, 238 and so forth has its contacts at differently spaced circumferential intervals. Thus, the outermost ring of contacts 236 has the smallest angular interval or circumferential spacing between successive contacts; the next circle of contacts 238 has a somewhat greater spacing, and so on until the innermost set of contacts 246 has the greatest spacing and the fewest number of contacts.

By means of a conductor 250, an insulated binding post 252 and a spring finger 254, the latter extending through an opening 256 in the upper end of the upper guide member or track 196, electrical contact is made with metallic strip 206 and to the plate 202 despite the different positions of sliding adjustment imparted to the body 198 by the handle 200. By means of the plate 202 and the movable contact 214 carried thereby, the electric current from the conductor 250 is successively applied to the sets of contacts 236, 238 and so forth depending upon the adjustment of the body 198.

The arrangement is such that the contact member 214 travels along a horizontal diameter of the assembly of discs 224, 226, 228 and horizontally through the axis of rotation of the shaft 218. Thus, the contact member 214 may be spaced to cooperate with any selected one of the annular set of contacts carried by the disc 226.

A further electric conductor 260 is secured to the binding post 262 and has a resilient finger 264 which abuts against and has continuous electric contact with the metallic central plate 228 and through the latter with each of the rings 234 and the sets of associated contacts. Thus, upon rotation of the set of plates all of the sets of contacts 236, 238 and so forth are in continuous electrical engagement with the central plate 228 which in turn is continuously electrically connected to the conductor 260.

It will now be understood that current may be supplied as by the conductor 260 to the metallic plate and through the latter to the sets of contacts upon the front insulating plate 226. From the latter, depending upon the setting of the slide 198, the current passes by one annular set of the contacts through the movable contact member 214 and through the spring finger 254 to the conductor 250. Thus, the circuit is completed as long as the stationary contact 214 is in electrical engagement with one of the contact members of one of the selected sets of contacts upon the front insulating disc 226. Obviously, the intervals of time between the electrical engagement of the contact 214 with one of the sets of contacts will be varied by shifting the slide 198 horizontally to thereby selectively position the contact 214 in the path of travel of different sets of contacts having different circumferential or arcuate spacing between them. For example, the spacing of the outermost set of contacts 236 may be such that there will be an interval of two minutes between the successive engagement of successive contacts 236. The indicia indicated in Figure 3 may be so positioned that when the slide is set for the movable contact 214 to engage the contacts 236, the numeral 2 will be visible at the window 190, as shown in Figure 3. When the slide is shifted inwardly, as to the numeral 4 of Figure 3, the contact 214 will engage the sets of contacts 238, which last mentioned contacts have twice the radial spacing of those of the outermost circle of contacts, and to thus provide a 4 minute interval between the engagement of successive contacts 238 by the contact 214. In a similar manner, the other sets of contacts may each have a different time interval between the engagement of successive contacts of the selected set by the member 214.

However, it is also possible to set the slide whereby the numeral 0 will appear at the window 190, at which time there may be a continuous connection between the fingers 264 and 254 whereby the manual adjusting means will be rendered inoperative and the usual automatic cycling of the record changer mechanism may be permitted to function in its normal manner. For this purpose, the slide 198 would be moved to the extreme left position, see Figures 3 and 4, and the member 214 would be connected to the finger 264 by any suitable continuous annular contact, not shown, placed on the edge of the plate 226 and connected to the central plate 228.

Referring now to Figure 1 it will be seen that there is provided a selector switch generally designated by the numeral 266. As will be seen by reference to Figure 1 and the diagrammatic view of Figure 11, the selector switch is movable between an off position 268, a no intermission position 270, a position 272 which will operate the turntable motor designated generally by the numeral 274 at a speed of 78 r.p.m.; a position 276 adapted to operate the motor at 33 r.p.m. for the playing of micro-groove or long-playing records, and to various other positions depending upon various other characteristics of the mechanism and with which the present invention is not particularly concerned.

Referring again to Figures 8, 10 and 11, it will be understood that the bracket 104 has mounted thereon a solenoid 175 which is suitably grounded and to which is connected the conductor 177. The solenoid is operatively connected to a latch 179, pivoted to the bracket 104 at 181, a spring 183 urging the latch into position to cause it to engage and retain the terminal plate 122 of the mercury switch when the latter is tilted in a counterclockwise position until this latch is released by actuation of the solenoid. As seen in Figure 11, the conductor 177 of the solenoid 175 is connected to the conductor 250, whereby when the latter is energized by the time control mechanism through the contact 254, the latch solenoid will be simultaneously actuated to release the mercury switch 120 which by means of its spring 124 will again close the operating circuit of the turntable motor 274.

As shown in Figure 8, the bracket 82 has lugs 187 upon which is pivoted a latch 189 adapted to engage and retain a collar 191 on the rod 154. The latter is thus secured in its lowered position, to which it is drawn by the solenoid 158 against the resistance of its return spring 193. A solenoid 195 having an electric conductor 197 is operatively connected to the latch 189 to release the same and permit the spring 193 to raise the rod 154 and operate the lever 160 to de-activate the clockwork mechanism 162.

The conductor 197 is suitably connected to the conductor 250 in order that the flow of electric current from the member 254 may simultaneously actuate both of the latch solenoids 175 and 195.

The operation of the device is as follows. When the selector switch 266 is set to its off position at 268, the entire current supply to the record player, including the turntable motor 274, is disconnected. When the switch is moved to the position 270, which is a no intermission position, the record player will operate in accordance with its usual automatic cycle for the automatic playing and changing of records.

When the switch is moved to the position 272 or to that of 276, the turntable will be operated at 78 r.p.m. or at 33 r.p.m. respectively, this being the speed for playing conventional records or long-playing records.

Let it be now assumed that a micro-groove record at 178 having multiple recordings 180 thereon is being played, with the selector switch 266 being moved past the no intermission position 270 to the position 272 or 276. Let it be also assumed that the selector slide 198 has been shifted to a position whereby the contact member 214 will register with successive contacts 236 which contacts have the shortest time interval provided upon the disc 226 and corresponding to the indicia 2 on Figures 2 and 3.

Under these conditions, when the outermost recording 180 is played, as shown in Figures 1, 16 or 20, the stylus will move into the transition groove 182 which leads the next recording to be played. When the stylus reaches the actuating element at 184 or 186, there will be a relative upward sliding movement of the spool 66 upon the stylus needle caused by either the depression 184 or the cam ribs 186, as previously set forth, thereby tilting the lever 26 upwardly at its forward end and downwardly at its rearward end. This downward tilting movement of the rear end will cause the segment member 28 to press downwardly on the rod 30, which in turn will press the lever 92 downwardly and thus tilt the mercury switch 120 against the resistance of the spring 124 until the latch 179 engages the mercury switch and returns it into depressed position. When this occurs, as seen in Figure 11, the tilting of the mercury switch will disconnect the source of current from the conductor 172 and the conductor 271 leading to the turntable motor 274 and will thus stop the automatic operation of the record player temporarily and will simultaneously complete the circuit between the other set of mercury switch contacts between the conductors 171 and 173, whereby the solenoid 158 will be actuated to move the rod 154 downwardly for retention by the latch 189 and will in turn actuate the lever 160 and thus place in motion the time clock mechanism 162, thereby imparting rotation to the shaft 218 and to the series of timer plates 224, 226, 228 secured thereto. After the desired time interval for which the slide 198 has been set has elapsed, the next contact 236 will register with the contact 214. This will in turn, through the conductors 250, 177 and 197, energize the latch solenoids 175 and 195, causing the latch 179 to release the mercury switch 120 and the latch 189 to release the rod 154, thereby causing the lever 160 to disconnect the time clock mechanism. The spring 124 thus causes the mercury switch to restore the electrical circuit of the motor 274, permitting the mechanism to resume its normal operation.

It will also be observed that when a conventional type of record having but a single recording upon one side thereof is played, at either 78 or 45 r.p.m., when the playing of the record has been completed and the tone arm moves into the groove 188 of Figure 16, the conventional record changing mechanism will be actuated, thereby causing the tone arm to lift from the record and then swing horizontally outwardly while the records are changed in preparation for the inward movement of the tone arm to its drop-down to a new playing position on the next record. However, as the tone arm swings outwardly, the roller 80 thereon will engage the cam lever 146 and depress the rod 136, thereby tripping the mercury switch and causing the previously mentioned operation.

It will thus be seen that regardless of whether the lever 26 is actuated to in turn operate the rod 30, or whether the roller 80 operates the cam lever 146 to operate the rod 136, in either event the lever 92 will be moved downwardly to trip the mercury switch, thereby initiating the operation of the time delay mechanism.

It will be noted that the selector switch has a plurality of contacts, two of which are numbered as at 272 and 276. Each of these contacts will activate the time delay mechanism in the manner set forth above. In addition, each will, by a means not shown, effect operation of the turntable motor 274 at the particular speed desired and will adjust the tone arm needle assembly in accordance with the speed at which a record is to be played.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In an automatic phonograph record player including a tone arm having a pick-up needle for playing a recording, means including a vital electric circuit for effecting automatic operation of the record player, switch means remote from said tone arm for temporarily interrupting said vital circuit, an actuator for said switch means mounted upon said tone arm and operable upon completion of the playing of a recording to actuate said switch means, means operable after a predetermined time interval for restoring said switch means to again render said vital circuit operative, said actuator being mounted for movement vertically of said tone arm.

2. In an automatic phonograph record player including a tone arm having a pick-up needle for playing a record, means including a vital electric circuit for effecting automatic operation of the record player and including a switch therein remote from said tone arm, actuating means mounted on said tone arm and responsive to the completion of playing a recording for actuating said switch to break said vital circuit whereby to temporarily stop operation of the record player, said last mentioned means being mounted for movement vertically of said tone arm, time delay mechanism operable after a predetermined time interval for restoring said switch to circuit closing position whereby to reactivate said vital circuit and restore automatic operation of said record player, means responsive to said actuation of said switch for initiating operation of said time delay mechanism.

3. The combination of claim 2 wherein said time delay mechanism includes means rendered operative after said predetermined interval of time for effecting return of said switch to circuit closing position and for stopping operation of said time delay mechanism.

4. The combination of claim 2 wherein said actuating means includes an actuator carried by said tone arm and sensitive to the completion of the playing of a recording, connecting means operatively interposed between said actuator and said switch and actuatable by the former to effect actuation of the latter.

5. The combination of claim 2 wherein said actuating means includes an actuator carried by said tone arm and sensitive to the completion of the playing of a recording, connecting means operatively interposed between said actuator and said switch and actuatable by the former to effect actuation of the latter, said actuator including a member movable relative to the tone arm and its stylus, and operable upon predetermined movement of the tone arm relative to a record disc for thereby imparting motion to said connecting means.

6. The combination of claim 2 wherein said actuating means includes an actuator carried by said tone arm and sensitive to the completion of the playing of a recording, connecting means operatively interposed between said actuator and said switch and actuatable by the former to effect actuation of the latter, said actuator including a member movably mounted upon the stylus of a tone arm and engageable and actuatable by a record disc upon predetermined movement of the tone arm towards the latter for thereby imparting motion to said connecting means.

7. The combination of claim 2 wherein said switch comprises a tiltable mercury switch urged to circuit closing position, a latch for retaining said switch in circuit breaking position, latch release means operatively connected to said time delay mechanism for actuation by the latter to release said latch upon completion of said predetermined time interval.

8. In an automatic phonograph record player having a vital electric circuit with a switch therein, means responsive to completion of the playing of successive recordings for actuating said switch to break said circuit, spring means urging said switch into circuit closing position, a latch retaining said switch in circuit breaking position upon said actuation of said switch, release means for releasing said latch from said switch, a time delay mechanism, means for starting and means for stopping operation of said time delay mechanism, means responsive to actuation of said switch for activating said starting means, means responsive to elapse of a predetermined time interval of operation of said time delay mechanism for activating said latch release means and said stopping means.

9. In an automatic phonograph record player having a vital electric circuit with a switch therein, means responsive to completion of the playing of successive recordings for actuating said switch to break said circuit, spring means urging said switch into circuit closing position, a latch retaining said switch in circuit breaking position upon said actuation of said switch, release means for releasing said latch from said switch, a time delay mechanism, means for starting and means for stopping operation of said time delay mechanism, means responsive to actuation of said switch for activating said starting means, means responsive to elapse of a predetermined time interval of operation of said time delay mechanism for activating said latch release means and said stopping means, said time delay mechanism including a rotary switch assembly and a clockwork mechanism for operating the same, said assembly having sets of relatively moving and stationary contacts, the contacts in each set of moving contacts being spaced for registration at different time intervals with a stationary contact, means for electrically connecting the relatively stationary and movable contacts to said release means and to said stopping means for controlling said means, means for selectively energizing a set of said contacts.

10. The combination of claim 9 wherein said starting means includes a control lever operatively connected to said clockwork mechanism and yieldingly urged to position for stopping said clockwork mechanism, a solenoid for moving said control lever to position for starting said clockwork mechanism, means operatively connecting said solenoid to said switch for energizing the former upon said actuation of the latter.

11. The combination of claim 10 wherein said means for stopping operation of said time delay mechanism includes a solenoid latch assembly operatively connected to said lever to retain the latter in position for operating said clockwork mechanism and operatively connected to said switch assembly for disengaging the solenoid latch assembly upon completion of said time interval.

12. A mechanism for producing adjustable time intervals in the automatic playing of successive recordings upon a record disc in an automatic record player having a vital electric circuit for operating the record player and a tone arm with a stylus for traversing the sound track of a record, and a time delay mechanism for temporarily interrupting said vital electric circuit comprising cam surfaces on said record disc at the end of a recording and disposed along their length at different distances from the bottom of the sound track of the record, an actuator operatively connected to said time delay mechanism and carried by said tone arm, said actuator being disposed between the tone arm and the record disc and positioned for engagement and movement by said cam surfaces, said actuator being mounted upon said stylus for relative movement thereon.

13. A record disc for automatic phonograph record players of the type having time delay mechanism for effecting a temporary stopping of the operation of the player for an adjustable time interval after completion of the playing of a recording upon a record disc which comprises: a cam surface on the record disc extending longitudinally of the sound track and at the end of the recording thereon, said cam surface having longitudinally successive portions disposed at different vertical distances from the bottom of the sound track and projecting above the surface of said record disc whereby to effect relative vertical movement of an actuator carried by the tone arm as the latter passes over the cam surface to thereby initiate action of the time control mechanism.

14. A stylus assembly for an automatic record player of the type for playing successive recordings upon record discs and having time delay mechanism for temporarily interrupting a vital electric circuit of the record player whereby to stop operation of the latter for a predetermined adjustable time interval after the playing of a recording and having a tone arm and an actuator carried thereby for initiating operation of said time delay mechanism and operable by a record for actuating said time delay mechanism comprising: a needle assembly carried by said tone arm and including a plurality of needles, means rotatably mounting said needles upon said tone arm for selectively positioning a needle into an operative position for playing a record, said actuator being carried by each needle and mounted for operation by a record being played, means for detachably connecting an actuator with said time delay mechanism when its associated needle is disposed into an operative position.

15. The combination of claim 16 wherein said connecting means includes a lever pivoted to said tone arm and operatively associated with said time delay mechanism, said lever having a movable element thereon, said element being movable into and out of a coupling engagement with said last mentioned actuator.

16. In an automatic phonograph record player including a tone arm having a pick-up needle for playing a record, means including a vital electric circuit for effecting automatic operation of the record player, a switch means remote from said tone arm for temporarily interrupting said vital circuit, means openable after a predetermined time after said switch means has interrupted said circuit for restoring said switch means to position for again closing said vital circuit, an actuating lever pivoted on said tone arm, mechanical means operatively connecting said actuating lever to said switch means, an actuator connected to said lever for causing pivotal movement thereof relative to said tone arm, said actuator being mounted on said needle for movement vertically thereof and engageable with a vertically displaced portion of a record whereby to effect relative vertical movement of said actuating lever upon said tone arm.

17. The combination of claim 16 wherein said actuating lever has a pivoted extremity detachably engaging said actuator.

18. The combination of claim 16 wherein said mechanical means comprises an actuator rod mounted in said record player for vertical movement, said actuating lever operatively engaging said rod for vertical movement thereof, said rod being operatively connected to said switch means.

19. The combination of claim 16 wherein said mechanical means comprises an actuator rod mounted in said record player for vertical movement, said actuating lever operatively engaging said rod for vertical movement thereof, said rod being operatively connected to said switch means, an actuated lever having a portion engaging said switch means, means mounting said actuated lever for pivotal movement, said actuator rod having a portion engaging said actuated lever for causing pivoting thereof.

20. The combination of claim 16 wherein said actuator comprises a spool slidable upon said pick-up needle, spring means engaging the needle and spool to urge the latter outwardly upon the former.

21. The combination of claim 16 wherein said actuator comprises a spool slidable upon said pick-up needle, spring means engaging the needle and spool to urge the latter outwardly upon the former, a stop on said needle limiting outward movement of the spool thereon.

22. The combination of claim 16 wherein said actuator comprises a spool slidable upon said pick-up needle, spring means engaging the needle and spool to urge the latter outwardly upon the former, said actuating lever having a pivoted extremity detachably connected to said spool.

23. The combination of claim 16 including means on a record for effecting relative vertical movement of said actuator on said needle.

24. The combination of claim 16 including an actuator member, means mounting said member for vertical movement, said member engaging at its lower portion said switch means, a pivoted lever engaging the upper end of said member, a cam surface on said pivoted lever, means on said tone arm engageable with said cam surface upon outward horizontal movement of said tone arm upon the completion of the playing of a record for depressing said pivoted lever and actuating said switch means.

25. In an automatic phonograph record player including a tone arm having a pick-up needle for playing a record, means including a vital electric circuit for effecting automatic operation of the record player, a switch means remote from said tone arm for temporarily interrupting said vital circuit, means operable after a predetermined time after said switch means has interrupted said circuit for restoring said switch means to position for again closing said vital circuit, an actuator rod mounted in said record player for vertical movement and having a lower portion thereof operatively engaging said switch means for actuation thereof, a pivoted lever overlying and operably engaging said actuator rod for depressing the same, a cam surface on said pivoted lever, means on said tone arm positioned for engaging said cam surface and depressing said pivoted lever upon outward swinging movement of the tone arm after a record has been played.

26. The combination of claim 1 wherein said actuator includes a movable member carried by said tone arm and disposed therebeneath and projecting downwardly therefrom and disposed for vertical movement relative to the tone arm upon engagement by a cam surface on a record disk.

27. The combination of claim 1 wherein said actuator includes a movable member carried by said tone arm and disposed therebeneath and projecting downwardly therefrom and disposed for vertical movement relative to the tone arm upon engagement by a cam surface on a record disk, connecting means disposed beneath but remote from said tone arm and said actuator and connected to said switch means for operating the latter, said actuator including a portion overlying said connecting means and position for imparting movement to the latter upon vertical movement of said actuator.

28. The combination of claim 1 wherein said tone arm includes a further actuating means thereon, a connecting means connected to said remote switch means and positioned for engagement and actuation by said further actuating means when said tone arm has completed playing of a record disk.

References Cited in the file of this patent

UNITED STATES PATENTS

| | | |
|---|---|---|
| 956,727 | Osborn | May 3, 1910 |
| 1,812,454 | Stockton | June 30, 1931 |
| 2,066,538 | Phelps | Jan. 5, 1937 |
| 2,458,623 | Mortimer | Jan. 11, 1949 |
| 2,523,629 | Olsson | Sept. 26, 1950 |
| 2,545,643 | Bender | Mar. 20, 1951 |
| 2,579,496 | Huston et al. | Dec. 25, 1951 |
| 2,627,415 | Rasmussen | Feb. 3, 1953 |

FOREIGN PATENTS

| | | |
|---|---|---|
| 332,688 | Great Britain | July 31, 1930 |
| 419,299 | Great Britain | Nov. 5, 1934 |
| 444,508 | Germany | May 24, 1927 |